(12) United States Patent
Stryapunin

(10) Patent No.: US 9,228,499 B2
(45) Date of Patent: Jan. 5, 2016

(54) SYSTEM FOR SECONDARY FUEL INJECTION IN A GAS TURBINE ENGINE

(75) Inventor: Sergey Aleksandrovich Stryapunin, Moscow (RU)

(73) Assignee: General Electric Company, Schenectady, NY (US)

( * ) Notice: Subject to any disclaimer, the term of this patent is extended or adjusted under 35 U.S.C. 154(b) by 511 days.

(21) Appl. No.: 13/509,549

(22) PCT Filed: Aug. 11, 2011

(86) PCT No.: PCT/RU2011/000607
§ 371 (c)(1),
(2), (4) Date: May 11, 2012

(87) PCT Pub. No.: WO2013/022367
PCT Pub. Date: Feb. 14, 2013

(65) Prior Publication Data
US 2013/0174558 A1    Jul. 11, 2013

(51) Int. Cl.
*F23R 3/34* (2006.01)
*F23R 3/28* (2006.01)
*F23R 3/00* (2006.01)
*F02C 7/22* (2006.01)

(52) U.S. Cl.
CPC . *F02C 7/22* (2013.01); *F23R 3/002* (2013.01); *F23R 3/283* (2013.01); *F23R 3/286* (2013.01); *F23R 3/34* (2013.01); *F23R 3/346* (2013.01); *F23R 2900/00017* (2013.01); *F23R 2900/03341* (2013.01)

(58) Field of Classification Search
CPC .. F23R 3/34; F23R 3/346; F23R 2900/00017; F23R 3/002; F23R 3/283

USPC ............................ 60/733, 746, 747, 796, 800
See application file for complete search history.

(56) References Cited

U.S. PATENT DOCUMENTS

| 2,748,567 | A  | * | 6/1956  | Dougherty ...................... 60/798 |
| 3,706,203 | A  | * | 12/1972 | Goldberg et al. ............... 60/757 |
| 5,274,991 | A  | * | 1/1994  | Fitts .............................. 60/800 |
| 6,201,029 | B1 | * | 3/2001  | Waycuilis ..................... 518/703 |
| 6,311,471 | B1 |   | 11/2001 | Waldherr et al. |

(Continued)

FOREIGN PATENT DOCUMENTS

| CN | 101551121 A | 10/2009 |
| EP | 1205712 A2  | 5/2002  |

(Continued)

OTHER PUBLICATIONS

Search Report and Written Opinion from PCT/RU2011/000607 dated Nov. 7, 2012.

(Continued)

*Primary Examiner* — Phutthiwat Wongwian
*Assistant Examiner* — Rene Ford
(74) *Attorney, Agent, or Firm* — Fletcher Yoder, P.C.

(57) ABSTRACT

Embodiments of the present disclosure provide a turbine combustor having a primary fuel injection system, a first wall portion disposed about a primary combustion zone downstream from the primary fuel injection system, and a second wall portion disposed downstream from the first wall portion. The turbine combustor also has a secondary fuel injection system disposed between the first wall portion and the second wall portion, where the secondary fuel injection system is removable form the first and second wall portions.

25 Claims, 6 Drawing Sheets

(56) References Cited

U.S. PATENT DOCUMENTS

| | | | |
|---|---|---|---|
| 6,334,310 B1* | 1/2002 | Sutcu et al. | 60/752 |
| 6,868,676 B1* | 3/2005 | Haynes | 60/776 |
| 7,082,766 B1* | 8/2006 | Widener et al. | 60/752 |
| 7,665,309 B2 | 2/2010 | Parker et al. | |
| 7,926,283 B2* | 4/2011 | Byrne et al. | 60/752 |
| 8,276,391 B2* | 10/2012 | Berry et al. | 60/782 |
| 2005/0050902 A1* | 3/2005 | Anichini et al. | 60/800 |
| 2009/0071159 A1 | 3/2009 | Parker et al. | |
| 2009/0084082 A1 | 4/2009 | Martin et al. | |
| 2009/0223228 A1* | 9/2009 | Romoser | 60/776 |
| 2010/0018209 A1 | 1/2010 | Ramier et al. | |
| 2010/0018210 A1 | 1/2010 | Fox et al. | |
| 2010/0071376 A1* | 3/2010 | Wiebe et al. | 60/740 |
| 2010/0154436 A1* | 6/2010 | Johnson et al. | 60/796 |
| 2010/0300116 A1* | 12/2010 | Kaleeswaran et al. | 60/800 |
| 2011/0067402 A1 | 3/2011 | Wiebe et al. | |

FOREIGN PATENT DOCUMENTS

| | | |
|---|---|---|
| EP | 1681514 A2 | 7/2006 |
| WO | 2011054760 A1 | 5/2011 |

OTHER PUBLICATIONS

Unofficial English Translation of Chinese Office Action issued in connection with corresponding CN Application No. 201180072819.3 on Nov. 19, 2014.

* cited by examiner

SYSTEM FOR SECONDARY FUEL INJECTION IN A GAS TURBINE ENGINE

CROSS-REFERENCE TO RELATED APPLICATION

This national stage application claims priority to and benefit of PCT Patent Application No. PCT/RU2011/000607, entitled "SYSTEM FOR INJECTING FUEL IN A GAS TURBINE ENGINE", filed Aug. 11, 2011, which is herein incorporated by reference in its entirety.

BACKGROUND OF THE INVENTION

The subject matter disclosed herein relates to gas turbine engines and, more particularly, to a system for injecting fuel in a gas turbine engine.

Gas turbine systems typically include at least one gas turbine engine having a compressor, a combustor, and a turbine. The combustor may have a primary combustion system and a secondary combustion system downstream from the primary combustion system. The secondary combustion system has fuel injectors for injecting fuel into a stream of combustion products of the primary combustion system. However, installation and maintenance of the fuel nozzles for the secondary combustion system may introduce complications. Depending on the application, the liner and/or transition piece of the combustor may require modifications to accommodate the fuel nozzles for the secondary combustion system. Furthermore, repairs and modifications to the fuel nozzles and the secondary combustion system may be difficult. For example, in a combustor having fuel nozzles for a secondary combustion system, the fuel nozzles may be difficult to locate or access during repair or disassembly. Additionally, supplying fuel to the fuel nozzles of the secondary combustion system may introduce further complications.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine combustor having a primary fuel injection system, a first wall portion disposed about a primary combustion zone downstream from the primary fuel injection system, and a second wall portion disposed downstream from the first wall portion. The turbine combustor further includes a secondary fuel injection system disposed between the first wall portion and the second wall portion, wherein the secondary fuel injection system is removable form the first and second wall portions.

In a second embodiment, a system includes a secondary fuel injection system having a support structure and a plurality of fuel nozzles coupled to the support structure, wherein the support structure is configured to mount to a turbine combustor downstream from a primary fuel injection system.

In a third embodiment, a system includes a turbine fuel injection module having an annular support structure comprising an inner annular wall, an outer annular wall disposed about the inner annular wall, and an air passage extending between the inner and outer annular walls. The turbine fuel injection module also has a plurality of fuel nozzles coupled to the annular support structure, wherein each fuel nozzle extends through the outer annular wall, the air passage and the inner annular wall. The turbine fuel injection module further includes at least one mount configured to mount the annular support structure removably to a turbine combustor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a partial cross-sectional side view of an embodiment of the turbine combustor shown in FIG. 2, taken along line 3-3, illustrating a separate module secondary fuel injection system removably coupled between a liner and a transition piece;

DETAILED DESCRIPTION OF THE INVENTION

Figure 1:
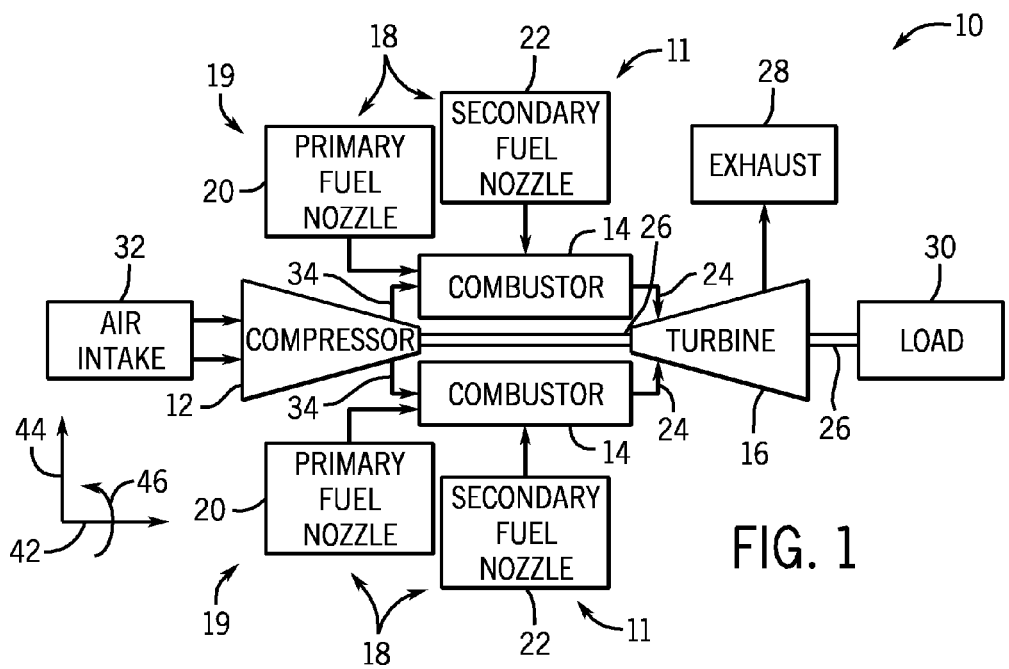
FIG. 1 is a schematic of an embodiment of a gas turbine system with a plurality of combustors, each having separate module secondary fuel injection systems.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to a separate module secondary fuel injection system that may be removably coupled to a turbine combustor. Before continuing, several terms used extensively throughout the present disclosure will be first defined in order to provide a better understanding of the claimed subject matter. As used herein, the terms "upstream" and "downstream," shall be understood to generally refer to directions relative to the flow of combustion gases inside the combustor. That is, unless otherwise indicated, the term "downstream" may refer to the direction in which a fuel-air mixture combusts and flows away from a head end of the combustor and towards a turbine. Similarly, the term "upstream," unless otherwise indicated, shall be understood to refer to the direction opposite the above-defined "downstream" direction.

As discussed in further detail below, the disclosed embodiments provide a separate module secondary fuel injection system (e.g., two or more fuel nozzles coupled to a common framework) that may be removably coupled to a turbine combustor, rather than mounting individual fuel nozzles directly to a liner, flow sleeve, and/or transition piece of the turbine combustor. For instance, in one embodiment, the separate module secondary fuel injection system is downstream from a primary fuel injection system and is removably coupled to the turbine combustor. Particularly, the separate module secondary fuel injection system is disposed between a liner and a transition piece of the turbine combustor, such that the liner and transition piece do not require special modification to support individual fuel nozzles. In addition, seals may be disposed between the separate module secondary fuel injection system and the liner, and seals may be disposed between the separate module secondary fuel injection system and the transition piece. The seals enable movement of the liner and transition piece relative to one another, while the separate module secondary fuel injection system may remain stationary. The separate module secondary fuel injection system includes a plurality of fuel nozzles coupled to a support structure or framework. More specifically, the support structure of the separate module secondary fuel injection system includes an inner wall, an outer wall disposed about the inner wall, and an air passage between the inner and outer walls. The fuel nozzles are coupled to the support structure, such that they pass through the outer wall, the air passage, and the inner wall to inject a fuel or an air/fuel mixture into the turbine combustor downstream from the primary fuel injection system. The separate module secondary fuel injection system further includes one or more mounts or flanges to removably mount the separate module secondary fuel injection system to the turbine combustor of the gas turbine system. Thus, the disclosed embodiments of the separate module secondary fuel injection system enables installation and removal of secondary fuel nozzles independent of the liner and the transition piece of the turbine combustor. Furthermore, the separate module supports any number of secondary fuel nozzles (e.g., 2 to 50), such that installation and removal of the multiple fuel nozzles is possible with the separate module.

Turning now to the drawings, FIG. 1 illustrates a block diagram of an embodiment of a gas turbine system 10 having separate module secondary fuel injection systems 11. The gas turbine system 10 includes a compressor 12, turbine combustors 14, and a turbine 16. The turbine combustors 14 include fuel nozzles 18 which route a liquid fuel and/or a gas fuel, such as natural gas or syngas, into the turbine combustors 14. As shown, each turbine combustor 14 has multiple fuel nozzles 18. More specifically, the turbine combustors 14 each include a primary fuel injection system 19 having primary fuel nozzles 20 and the secondary fuel injection system 11 having secondary fuel nozzles 22. As discussed in detail below, embodiments of the separate module secondary fuel injection system 11 are separate modules, which are removably coupled to the turbine combustors 14. For example, each separate module secondary fuel injection system 11 may include a plurality of secondary fuel nozzles 22 (e.g., 2 to 50) coupled to a common support structure of the module 11. The turbine combustors 14 ignite and combust an air-fuel mixture, and then pass hot pressurized combustion gasses 24 (e.g., exhaust) into the turbine 16. Turbine blades are coupled to a shaft 26, which is also coupled to several other components throughout the turbine system 10. As the combustion gases 24 pass through the turbine blades of the turbine 16, the turbine 16 is driven into rotation, which causes the shaft 26 to rotate. Eventually the combustion gases 24 exit the turbine system 10 via an exhaust outlet 28. Further, the shaft 26 is coupled to a load 30, which is powered via rotation of the shaft 26. The load 30 may be any suitable device that generates power via the rotational output of the turbine system 10, such as an electrical generator, a propeller of an airplane, or another load.

The compressor 12 of the gas turbine system 10 includes compressor blades. The compressor blades within the compressor 12 are coupled to the shaft 26, and will rotate as the shaft 26 is driven to rotate by the turbine 16, as discussed above. As the compressor blades rotate within the compressor 12, the compressor 12 compresses air received from an air intake 32 to produce pressurized air 34. The pressurized air 34 is then fed into the fuel nozzles 18 of the combustors 14. The fuel nozzles 18 mix the pressurized air 34 and fuel to produce a suitable mixture ratio for combustion, e.g., a combustion that causes the fuel to more completely burn, so as not to waste fuel or cause excess emissions. In the following discussion, reference may be made to an axial direction or axis 42 (e.g., a longitudinal axis), a radial direction or axis 44, and a circumferential direction or axis 46 of the combustor 14.

Figure 2:
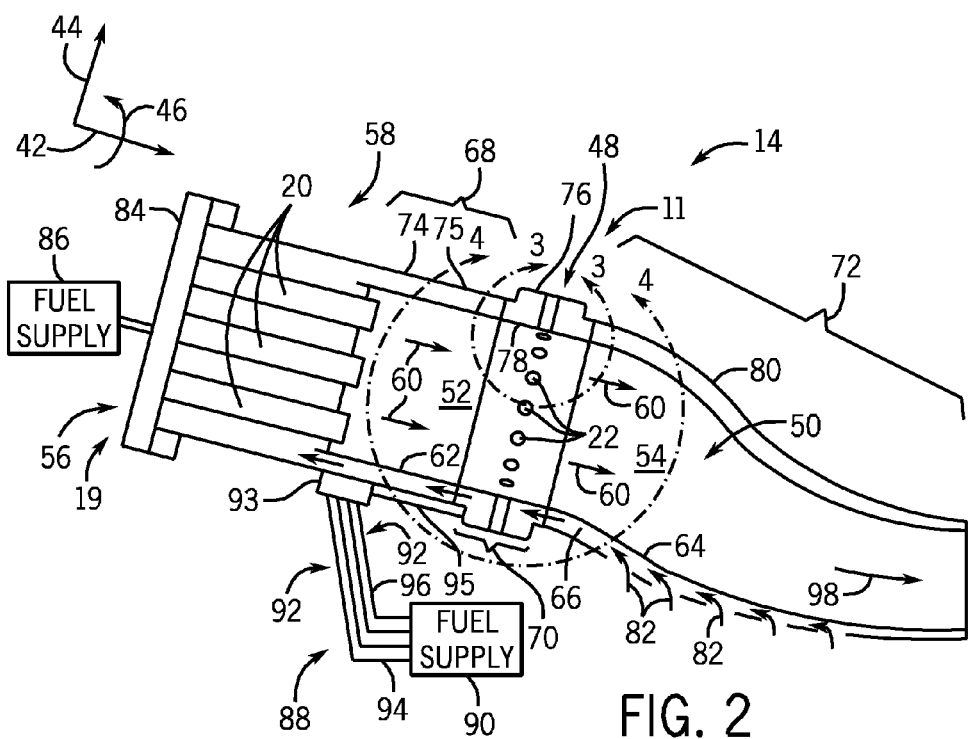
FIG. 2 is a cross-sectional side view of an embodiment of one of the turbine combustors illustrated in FIG. 1 having a separate module secondary fuel injection system.

FIG. 2 is a cross-sectional side view of an embodiment of one of the turbine combustors 14 shown in FIG. 1, illustrating a separate module secondary fuel injection system 11, 48. As mentioned above, the turbine combustor 14 is generally fluidly coupled to the compressor 12 and the turbine 16. In the illustrated embodiment, a combustion chamber 50 of the turbine combustor 14 has a primary combustion zone 52 and a secondary combustion zone 54, which is downstream from the primary combustion zone 52. More specifically, a primary fuel injection system 19, 56 near a head end 58 of the turbine combustor 14 injects an air-fuel mixture for combustion in the primary combustion zone 52, thereby producing a stream of combustion products 60. Similarly, the separate module secondary fuel injection system 48 injects a secondary air-fuel mixture into the stream of combustion products 60 for combustion in the secondary combustion zone 54. For example, the separate module secondary fuel injection system 48 may be a late lean injection (LLI) secondary fuel injection system. In the illustrated embodiment, the separate module secondary fuel injection system 48 is disposed axially between a liner 62 and a transition piece 64 of the turbine combustor 14 and is a self-contained unit. As discussed in detail below, the self-contained design of the separate module secondary fuel injection system 48 may be beneficial when assembling, modifying, repairing, or testing the separate module secondary fuel injection system 48. For example, the system 48 may be installed and removed without completely removing the liner 62 and/or the transition piece 64, which may generally remain mounted in the combustor 14. Furthermore, the system 48 enables simultaneous installation and removal of multiple secondary fuel nozzles 22 (e.g., 2 to 50) at the same time, rather than requiring separate installation and removal of each secondary fuel nozzle 22.

In the illustrated embodiment, the turbine combustor 14 has an annulus 66 configured to receive the pressurized air 34 from the compressor 12. Specifically, the annulus 66 has an upstream portion 68, an intermediate portion 70, and a downstream portion 72. The upstream portion 68 is defined by the liner 62 and a flow sleeve 74 of the turbine combustor 14, wherein the flow sleeve 74 surrounds the liner 62 (e.g., coaxial or concentric). In certain embodiments, the upstream portion 68 may also include a secondary fuel supply case 75 coupled to the flow sleeve 74. Further, the intermediate portion 70 of the annulus 66 is defined by an outer wall 76 and an inner wall 78 of the separate module secondary fuel injection system 48, wherein the outer wall 76 surrounds the inner wall 78 (e.g., coaxial or concentric). Still further, the downstream portion 72 of the annulus 66 is defined by the transition piece 64 and an impingement sleeve 80 of the turbine combustor 14, wherein the impingement sleeve 80 surrounds the transition piece 64 (e.g., coaxial or concentric). As mentioned above, the separate module secondary fuel injection system 48 is connected to the turbine combustor 14 axially between the liner 62 and the transition piece 64. As shown, the connection between the liner 62, the separate module secondary fuel injection system 48, and the transition piece 64 is such that the upstream portion 68, intermediate portion 70, and downstream portion 72 of the annulus 66 are fluidly and mechanically coupled together. Pressurized air 34 received by the annulus 66 from the compressor 12 is directed towards the head end 58 of the turbine combustor, as shown by arrows 82.

The head end 58 of the turbine combustor 14 has a cover plate 84 that may at least partially support the primary fuel nozzles 20. The cover plate 84 further provides a path through which the pressurized air 34 is directed from the annulus 66 to the primary fuel nozzles 20. The primary fuel injection system 19 also includes a primary fuel supply 86, which provides fuel to the primary fuel nozzles 20. For example, the fuel supplied by the primary fuel supply 86 may be a liquid fuel and/or a gaseous fuel. While the illustrated embodiment shows only one primary fuel supply 86, other embodiments of the combustor 14 may include more than one (e.g., 2, 3, 4, or more) primary fuel supply 86. In embodiments having multiple primary fuel supplies 86, the primary fuel supplies 86 may provide the same type of fuel, or different types of fuel to the primary fuel nozzles 20. For example, one primary fuel supply 86 may provide a liquid fuel to a number of the primary fuel nozzles 20, while another primary fuel supply 86 may provide a gaseous fuel to other primary fuel nozzles 20. The primary fuel nozzles 20 combine the fuel from the primary fuel supply 86 and the pressurized air 34 to create an air/fuel mixture, which is combusted in the primary combustion zone 52 to produce the combustion gases 60.

The combustion gases 60 created in the primary combustion zone 52 flow downstream from the head end 58 of the turbine combustor 14 towards the separate module secondary fuel injection system 48. As mentioned above, the separate module secondary fuel injection system 48 includes the secondary fuel nozzles 22, which inject additional fuel into the stream of combustion gases 60 for combustion in the secondary combustion zone 54. Fuel is supplied to the secondary fuel nozzles 22 in the separate module secondary fuel injection system 48 by a secondary fuel system 88, which includes a secondary fuel supply 90. While the illustrated embodiment shows only one secondary fuel supply 90, other embodiments may include more than one (e.g., 2, 3, 4, or more) secondary fuel supplies 90. In embodiments having multiple secondary fuel supplies 90, the secondary fuel supplies 90 may provide the same type of fuel, or different types of fuel to the secondary fuel nozzles 22. For example, one secondary fuel supply 90 may provide a liquid fuel to a number of the secondary fuel nozzles 22, while another secondary fuel supply 90 may provide a gaseous fuel to other secondary fuel nozzles 22. As shown, fuel lines 92 flow the fuel from the secondary fuel supply 90 to a fuel pipe 93. In the illustrated embodiment, the fuel from the secondary fuel supply 90 passes from the fuel pipe 93 to a fuel passage 95, which flows the fuel to the secondary fuel nozzles 22 of the separate module secondary fuel injection system 48. Additionally, multiple fuel lines 92 from multiple respective secondary fuel supplies 90 may be routed to a single secondary fuel nozzle 22. In this manner, the fuel provided to each secondary fuel nozzle 22 may be split between two or more secondary fuel supplies 90. As will be appreciated, each fuel line 92 may pass to a single fuel pipe 93 or to separate respective fuel pipes 93. Similarly, multiple fuel lines 92 may be routed from a single secondary fuel supply 90 to the secondary fuel nozzles 22. For example, in the illustrated embodiment, a first fuel supply line 94 and a second fuel supply line 96 are routed from the secondary fuel supply 90 to the secondary fuel nozzles 22. In certain embodiments, the secondary fuel nozzles 22 combine the fuel received by the secondary fuel supply 90 with the pressurized air 34 from the annulus 66 (i.e., the pressurized air 34 supplied by the compressor 12, as shown by arrows 82) to create an air/fuel mixture for combustion in the secondary combustion zone 54. In other embodiments, the secondary fuel nozzles 22 inject fuel from the secondary fuel supply 90 and air separately into the stream of combustion products 60 for combustion in the secondary combustion zone 54. As discussed below, the self contained design of the separate module secondary fuel injection system 48 may provide improved and simplified access to the secondary fuel nozzles 22 for customization, modification, repair, and/or replacement of the secondary fuel nozzles 22. After combustion in the secondary combustion zone 54, the combustion gases 60 continue downstream, as indicated by arrow 98, toward the turbine 16.

FIG. 3 is a partial cross-sectional side view of an embodiment of the separate module secondary fuel injection system 48, taken along line 3-3 of FIG. 2, illustrating the separate module secondary fuel injection system 48 coupled between the liner 62 and the transition piece 64 of the turbine combustor 14. As mentioned above, the separate module secondary fuel injection system 48 is a self-contained unit that may be independently removed from the turbine combustor 14. The segregable design of the separate module secondary fuel injection system 48 simplifies access to and modification of the separate module secondary fuel injection system 48 and the secondary fuel nozzles 22.

As mentioned above, the separate module secondary fuel injection system 48 is disposed between the liner 62 and the transition piece 64 of the turbine combustor. In certain embodiments, the liner 62 may be short cut (i.e., reduced in length) at an end 120 of the liner 62 to accommodate the separate module secondary fuel injection system 48. Similarly, the flow sleeve 74 or secondary fuel supply case 75 of the turbine combustor 14 may be short cut at an end 122 to accommodate the separate module secondary fuel injection system 48. By contrast, no modification may be required of the transition piece 64 and/or the impingement sleeve 80. In other embodiments, some, all, or none of the liner 62, flow sleeve 74, transition piece 64, and impingement sleeve 80 may need to be modified to accommodate the separate module secondary fuel injection system 48.

In the illustrated embodiment, the liner 62 of the turbine combustor 14 is received by the separate module secondary fuel injection system 48. Specifically, the liner 62 abuts an inner surface 124 of the inner wall 78 of the separate module secondary fuel injection system 48. As shown, the liner 62 includes a first hula seal 126, which is disposed radially between the liner 62 and the inner wall 78 of the separate module secondary fuel injection system 48. Specifically, the first hula seal 126 is biased towards the inner wall 78 of the separate module secondary fuel injection system 48. As discussed in detail below, the first hula seal 126 is compressed and creates a seal between the liner 62 and the inner wall 78 of the separate module secondary fuel injection system 48, while still allowing relative movement between the liner 62 and the separate module secondary fuel injection system 48. Furthermore, the flow sleeve 74 or the secondary fuel supply case 75 of the turbine combustor 14 is coupled to the outer wall 76 of the separate module secondary fuel injection system 48. In particular, the outer wall 76 of the separate module secondary fuel injection system 48 includes a flange 128 having a recess 130, e.g., a threaded hole. Similarly, the flow sleeve 74 or the secondary fuel supply case 75 includes a flange 132 having an aperture 134, which aligns with the recess 130 of the flange 128. As shown, a fastener 136 is disposed through the aperture 134 of the flange 132 and is received by the recess 130 of the flange 128, thereby securing the flow sleeve 74 or the secondary fuel supply case 75 to the outer wall 76 of the separate module secondary fuel injection system 48. For example, the fastener 136 may be a bolt, stud, screw, or pin. In certain embodiments, the flange 128 of the outer wall 76 may have multiple recesses 130, and the flange 132 of the flow sleeve 74 or the secondary fuel supply case 75 may have multiple apertures 134 that align with respective recesses 130 of the flange 128. Each aperture 134 and respective recess 130 may receive a fastener 136 to secure the flow sleeve 74 or the secondary fuel supply case 75 to the outer wall 76 of the separate module secondary fuel injection system 48.

The transition piece 64 of the turbine combustor 14 receives the inner wall 78 of the separate module secondary fuel injection system 48. Specifically, an outer surface 138 of the inner wall 78 abuts the transition piece 64. Further, the inner wall 78 includes a second hula seal 140, which is disposed radially between the inner wall 78 and the transition piece 64. Specifically, the second hula seal 140 is biased towards the transition piece 64. As discussed above, the second hula seal 140 is compressed and creates a seal between the inner wall 78 of the separate module secondary fuel injection system 48 and the transition piece 64, while still enabling relative movement between the inner wall 78 and the transition piece 64. Furthermore, the first and second hula seals 126 and 140 enable movement of the liner 62 and the transition piece 64 relative to one another. For example, the separate module secondary fuel injection system 48 may be mounted or anchored to a compressor discharge case, such that the separate module secondary fuel injection system 48 is stationary. Even though the separate module secondary fuel injection system 48 may be stationary, the first and second hula seals 126 and 140 provide for free displacement between the liner 62 and the transition piece 64. In other words, the liner 62 and transition piece 64 may move with respect to the separate module secondary fuel injection system 48 and one another. The ability of the liner 62 and the transition piece 64 to move or shift with respect to each other and the separate module secondary fuel injection system 48 may be beneficial in embodiments, where operating parameters and combustion dynamics cause the liner 62 and the transition piece 64 to physically shift or fluctuate.

The outer wall 76 of the separate module secondary fuel injection system 48 also includes a flange 142, which abuts the impingement sleeve 80. The flange 142 further includes a recess 144, which houses a piston ring seal 146. Similar to the first and second hula seals 126 and 140, the piston ring seal 146 provides a seal between the impingement sleeve 80 and the outer wall 76, while still enabling relative movement between the impingement sleeve 80 and the separate module secondary fuel injection system 48.

The illustrated embodiment includes a secondary fuel nozzle 22 housed by the separate module secondary fuel injection system 48. As discussed in detail below, the separate module secondary fuel injection system 48 may house multiple secondary fuel nozzles 22 (e.g., 2 to 50). In the illustrated embodiment, the secondary fuel nozzle 22 is disposed within a shaft 148 that extends radially between the outer wall 76 and the inner wall 78 of the separate module secondary fuel injection system 48. As shown, the secondary fuel nozzle 22 includes a mounting portion 150, which abuts the outer wall 76 of the separate module secondary fuel injection system 48. The mounting portion 150 is secured to the outer wall 76 with fasteners 152. For example, the fasteners 152 may be bolts, pins, screws, and so forth. The secondary fuel nozzle 22 includes fuel ports 154, which inject fuel from the secondary fuel supply 90 into a passage 156 defined by a shaft 158 of the secondary fuel nozzle 22. As indicated by arrow 160, the fuel deposited by the fuel ports 154 flows through the passage 156 towards the combustion chamber 50 of the turbine combustor 14. As discussed below, the fuel may be mixed with air inside the passage 156 to create an air/fuel mixture to be deposited into the stream of combustion gases 60 within the combustion chamber 50.

In the illustrated embodiment, the passage 156 of the secondary fuel nozzle 22 has an exit 162 (e.g., a peripheral end), which is flush with an aperture 164 of the inner wall 78. In other words, the shaft 158 of the secondary fuel nozzle 22 extends to the aperture 164 of the inner wall 78. At the exit 162, the fuel or air/fuel mixture supplied by the secondary fuel nozzle 22 is injected into the stream of combustion gases 60. In other embodiments, the shaft 158 of the secondary fuel nozzle 22 may extend or protrude radially within the combustion chamber 50, such that the exit 162 of the passage 156 is offset from the inner wall 78 within the combustion chamber 50. As will be appreciated, each secondary fuel nozzle 22 housed by the separate module secondary fuel injection system 48 includes a respective shaft 158 that extends to or through a respective aperture 164 in the inner wall 78. Furthermore, in the illustrated embodiment, the secondary fuel nozzle 22 has an orientation such that a flow of a fuel or an air/fuel mixture deposited into the combustion chamber 50 by the secondary fuel nozzle 22 is generally perpendicular to the stream of combustion gases 60 within the combustion chamber 50. As discussed in detail below, other embodiments may include secondary fuel nozzles 22 having an orientation where a flow of a fuel or air/fuel mixture supplied by the secondary fuel nozzle 22 is at an angle downstream or is generally parallel with the stream of combustion gases 60 within the combustion chamber 50.

Figure 4:
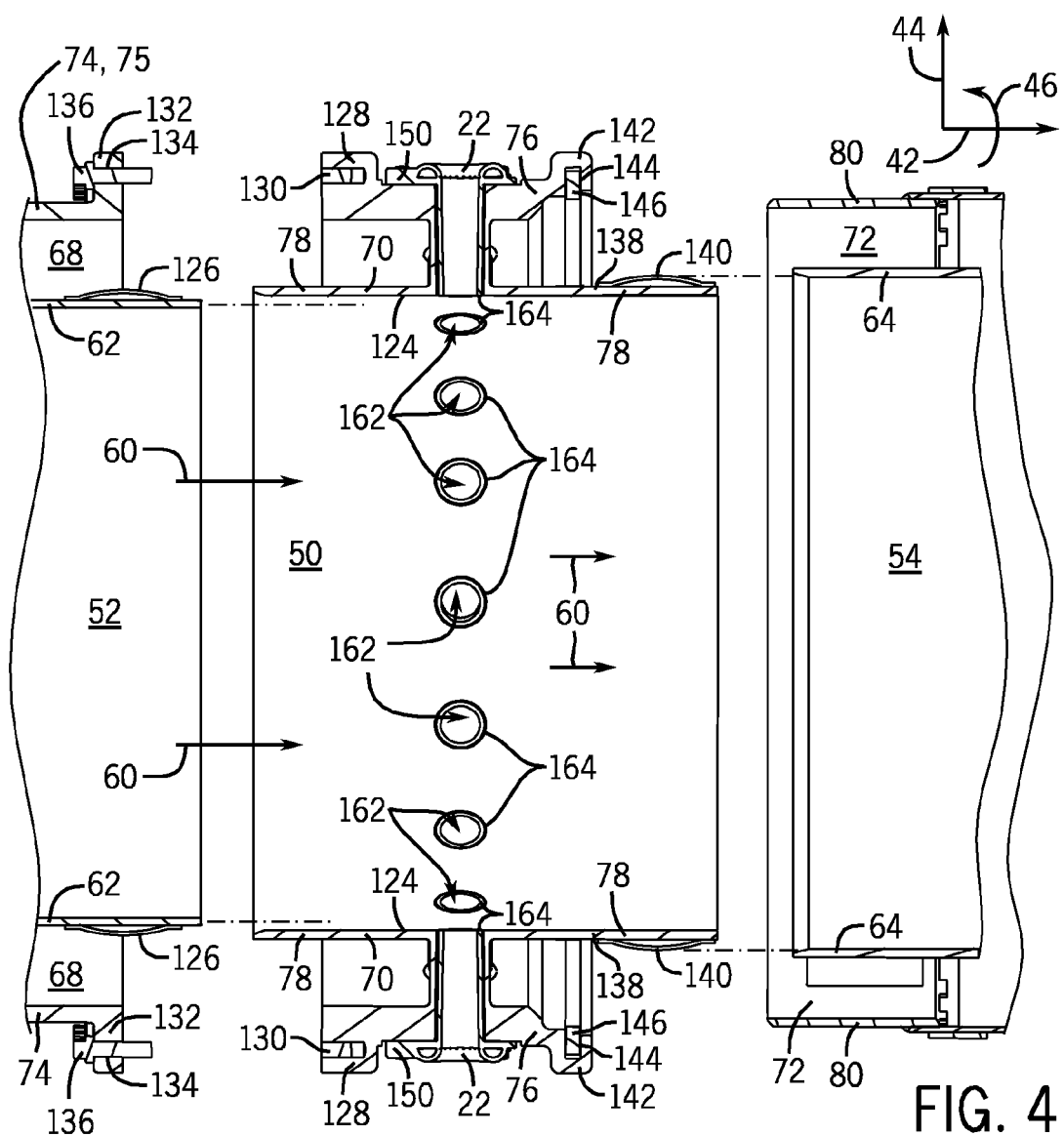
FIG. 4 is an exploded partial cross-sectional side view of an embodiment of the turbine combustor shown in FIG. 2, taken along line 4-4, illustrating a separate module fuel injection system exploded between a liner and a transition piece.

FIG. 4 is an exploded cross-sectional side view of an embodiment of the separate module secondary fuel injection system 48 of FIG. 3, taken alone line 4-4 of FIG. 2 The illustrated embodiment includes similar elements and element numbers as the embodiment shown in FIG. 3. Additionally, the illustrated embodiment shows additional secondary fuel nozzles 22 housed by the separate module secondary fuel injection system 48. The inner wall 78 includes multiple apertures 164 through which a fuel or air/fuel mixture is deposited by a respective secondary fuel nozzle 22.

The illustrated embodiment shows the manner in which the separate module secondary fuel injection system 48 may be removably coupled to the liner 62 and the transition piece 64. As shown, the self-contained design of the separate module secondary fuel injection system 48 allows the separate module secondary fuel injection system 48 to be completely and independently removed from the turbine combustor 14. In this manner, repairs, modifications, and replacement of the separate module secondary fuel injection system 48 and the secondary fuel nozzles 22 may be simplified and streamlined For example, the separate module secondary fuel injection system 48 may be removed from the turbine combustor 14 for replacement of some or all of the secondary fuel nozzles 22.

Figure 5:
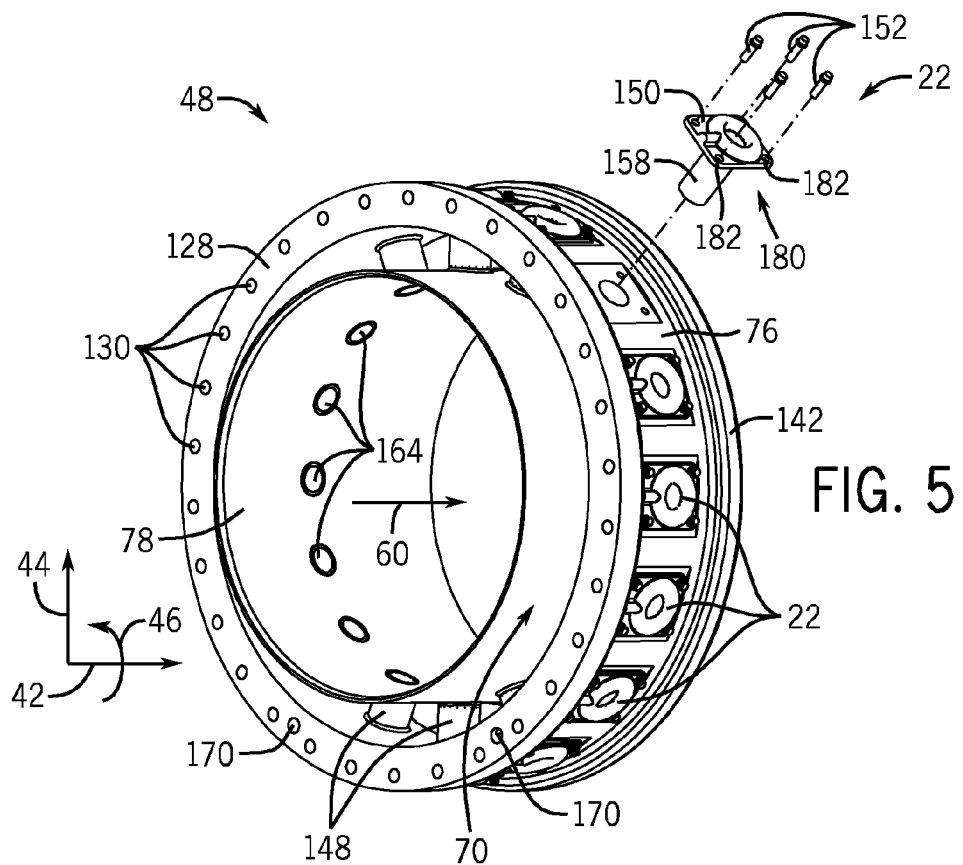
FIG. 5 is a perspective view of an embodiment of the separate module secondary fuel injection system of FIGS. 2-4, illustrating a plurality of installed fuel nozzles and a single exploded fuel nozzle relative to a framework.

FIG. 5 is a perspective view of an embodiment of the separate module secondary fuel injection system 48 of FIG. 3, illustrating plurality of installed fuel nozzles 22 and one removed fuel nozzle 22, e.g., exploded secondary fuel nozzle 22, 180. The illustrated embodiment includes similar elements and element numbers as the embodiment shown in FIG. 4. As mentioned above, the separate module secondary fuel injection system 48 is a self-contained unit which may be beneficial when replacing the separate module secondary fuel injection system 48 or its components. The illustrated embodiment includes the inner wall 78 which receives the liner 62 of the turbine combustor 14. Moreover, the illustrated embodiment of the separate module secondary fuel injection system 48 includes sixteen secondary fuel nozzles 22. Other embodiments of the separate module secondary fuel injection system 48 may include other numbers of secondary fuel nozzles 22. For example, the separate module secondary fuel injection system 48 may include approximately 1 to 50, 1 to 20, 1 to 15, 1 to 10 or 1 to 5 secondary fuel nozzles 22. Furthermore, as mentioned above, the flange 128 includes multiple recesses 130, e.g., threaded holes, which align with respective apertures 134 in the flange 132 of the flow sleeve 74 or the secondary fuel supply case 75. Each aperture in the flange 132 and its respective recess 130 in the flange 128 receive a fastener 136 to secure the flow sleeve 74 or the secondary fuel supply case 75 to the separate module secondary fuel injection system 48. Furthermore, the flange 128 includes fuel passages 170. As discussed above, fuel from the secondary fuel supply 90 passes through the fuel pipe 93 and the fuel passage 95 to the separate module secondary fuel injection system 48. More specifically, the fuel passes from the fuel passage 95 into the fuel passages 170. From the fuel passages 170, the fuel is supplied to the secondary fuel nozzles 22. The illustrated embodiment includes two fuel passages 170. The two fuel passages 170 may receive fuel from the same secondary fuel supply 90 or each fuel passage 170 may receive fuel from different secondary fuel supplies 90. In the illustrated embodiment, the secondary fuel nozzles 22 have a generally annular shape. However, in other embodiments, the secondary fuel nozzles 22 may have other shapes (e.g., oval, polygonal, square, rectangular, and so forth).

In the illustrated embodiment, the secondary fuel nozzle 22, 180 is exploded from the separate module secondary fuel injection system 48. As discussed in detail below, the secondary fuel nozzle 180 may have a variety of configurations. For example, the secondary fuel nozzle 180 may inject a fuel flow into the stream of combustion gases 60. Alternatively, the secondary fuel nozzle 180 may inject an air/fuel mixture flow into the stream of combustion gases 60. While the illustrated embodiment shows all secondary fuel nozzles 22 having similar configurations, other embodiments may include secondary fuel nozzles having varying configurations. As illustrated, four fasteners 152 are used to secure the secondary fuel nozzle 180 to the outer wall 76 of the separate module secondary fuel injection system 48. Specifically, the fasteners 152 are received by mounting apertures 182 formed in the mounting portion 150 of the secondary fuel nozzle 22. Other embodiments may use other numbers of fasteners 152 to secure the secondary fuel nozzles 22 to the outer wall 76. For example, 2 to 10 fasteners 152 may be used to secure the fuel nozzles 180 to the separate module secondary fuel injection system 48. As mentioned above, the fasteners 152 may be bolts, screws, pins, and so forth.

Figure 6:
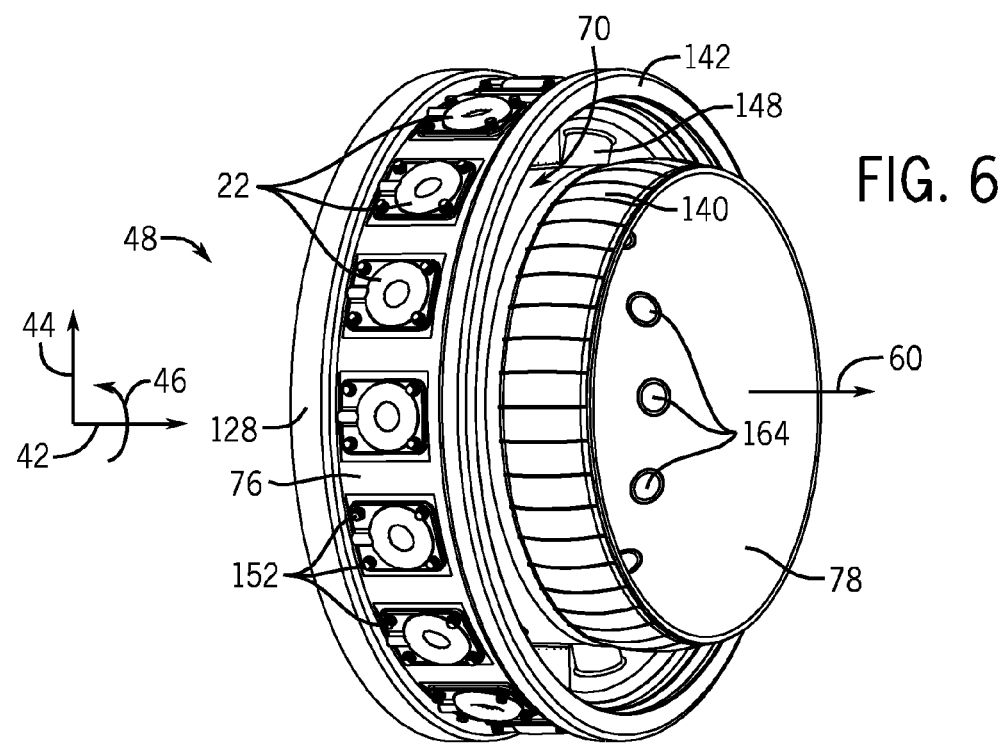
FIG. 6 is a perspective view of an embodiment of the separate module secondary fuel injection system of FIG. 5, illustrating a hula seal.

FIG. 6 is a perspective view of an embodiment of the separate module secondary fuel injection system 48 of FIG. 3. The illustrated embodiment includes similar elements and element numbers as the embodiment shown in FIG. 3. The illustrated embodiment includes the hula seal 140 that is received by the transition piece 64. As shown, the hula seal 140 has an annular configuration and is biased towards the transition piece 64. When the inner wall 78 is received by the transition piece 64, the hula seal 140 is compressed and creates a seal between the inner wall 78 and the transition piece 64 and about an inner circumference of the transition piece 64, while still permitting relative movement between the inner wall 78 and the transition piece 64. Additionally, as mentioned above, the flange 142 of the outer wall 76 includes the piston ring seal 146 disposed in the recess 144 of the flange 142. When the inner wall 78 is received by the transition piece 64, the flange 142 abuts the impingement sleeve 80 and the piston ring seal 146 creates a flexible seal between the flange 142 of the outer wall 76 and the impingement sleeve 80.

Figure 7:
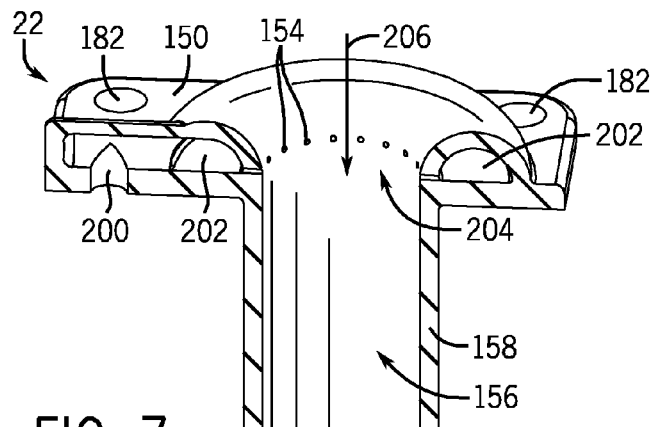
FIG. 7 is a partial cutaway perspective view of an embodiment of a fuel nozzle that may be used with the separate module secondary fuel injection system of FIGS. 2-6.

FIG. 7 is a cross-sectional perspective view of an embodiment of a secondary fuel nozzle 22 that may be used with and housed by the separate module secondary fuel injection system 48 of FIG. 3. As discussed above, the secondary fuel nozzle 22 mixes fuel and air to create an air/fuel mixture that flows into the secondary combustion zone 54 to be ignited and combusted. The illustrated embodiment includes similar elements and element numbers as the secondary fuel nozzle 22 shown in FIG. 3.

In the illustrated embodiment, the mounting portion 150 of the secondary fuel nozzle 22 includes a fuel inlet 200 configured to receive fuel from the fuel passage 170. In other embodiments, the secondary fuel nozzle 22 may include two or more fuel inlets 200. Additionally, in embodiments having two or more fuel inlets 200, the secondary fuel nozzle 22 may be configured to receive two or more different fuels from multiple fuel passages 170, e.g., from multiple secondary fuel supplies 90. The fuel inlet 200 is operatively coupled to an annular fuel passage 202 that extends around a circumference of an opening 204 of the passage 156. The annular fuel passage 202 is further operatively coupled the fuel ports 154. Specifically, the fuel supplied by the secondary fuel supply 90 exits the annular fuel passage 202 through the fuel ports 154 and flows into the passage 156 of the secondary fuel nozzle 22. Moreover, air flows into the passage 156 through the opening 204, as indicated by arrow 206. Within the passage 156, the fuel and air mix to form the air/fuel mixture, which is then injected into the secondary combustion zone 54 of the turbine combustor 14 through the exit 162 of the secondary fuel nozzle 22. As mentioned above, in certain embodiments, the exit 162 of the secondary fuel nozzle 22 may be flush with the aperture 164 in the inner wall 78 of the separate module secondary fuel injection system 48. In other embodiments, the secondary fuel nozzle 22 may extend into the secondary combustion zone 54, such that the exit 162 of the secondary fuel nozzle is suspended within (e.g., protrudes into) the secondary combustion zone 54 of the turbine combustor 14.

Figure 8:
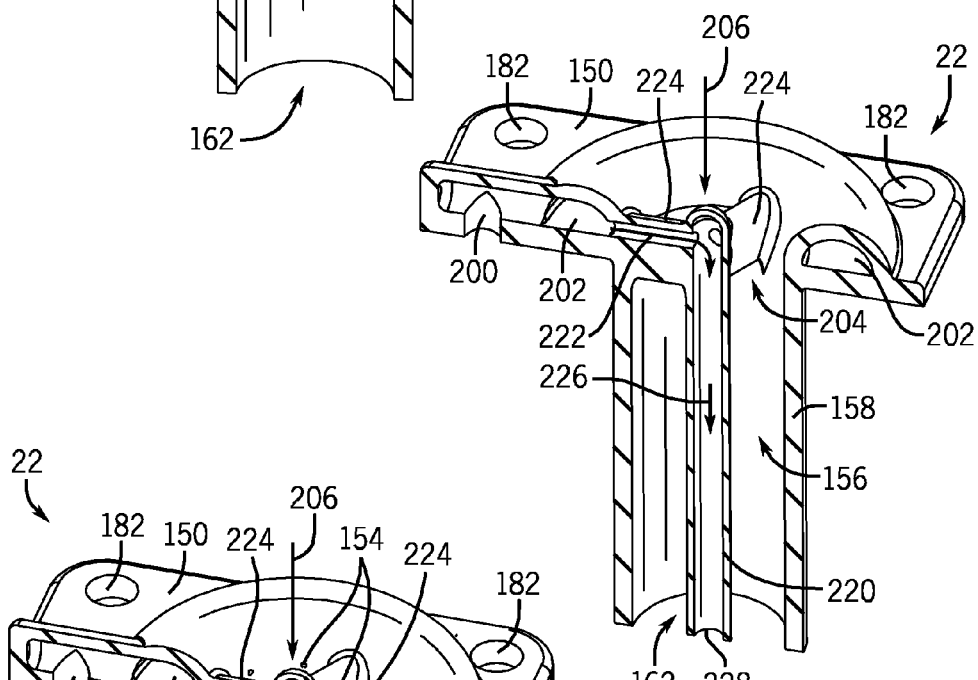
FIG. 8 is a partial cutaway perspective view of an embodiment of a fuel nozzle that may be used with the separate module secondary fuel injection system of FIGS. 2-6.

FIG. 8 is a cross-sectional perspective view of an embodiment of a secondary fuel nozzle 22 that may be used with and housed by the separate module secondary fuel injection system 48 of FIG. 3. The illustrated embodiment includes similar elements and element numbers as the embodiment shown in FIG. 7. Additionally, the illustrated embodiment includes a fuel pipe 220 disposed within the passage 156 of the secondary fuel nozzle 22. As discussed above, fuel routed from the secondary fuel supply 90 enters the secondary fuel nozzle 22 through the fuel inlet 200. Subsequently, the fuel is routed to the annular fuel passage 202. In the illustrated embodiment, the annular fuel passage 202 is operatively coupled to the fuel pipe 200. As indicated by arrow 222, fuel flows from the annular fuel passage 202 to the fuel pipe 220 through a fuel path 224. The secondary fuel nozzle 22 may include 2, 3, 4, 5, 6 or more fuel paths 224. As illustrated, each fuel path 224 may be a radial or crosswise tube, which extends radially inward toward and supports the fuel pipe 220. For example, the illustrated fuel nozzle includes three evenly spaced fuel paths 224 (e.g., tubes) that support the fuel pipe 220.

The fuel flows through the fuel pipe 220, as indicated by arrow 226, and exits the fuel pipe 220 through a fuel pipe exit 228. In the illustrated embodiment, the fuel pipe 220 has a cylindrical configuration and is generally coaxial and concentric with the fuel passage 156 of the secondary fuel nozzle 22. Furthermore, the fuel pipe exit 228 is generally flush with the exit 162 of the secondary fuel nozzle 22. As a result, in embodiments where the fuel pipe exit 228 and the exit 162 of the secondary fuel nozzle 22 are flush with the aperture 164 in the inner wall 78 of the separate module secondary fuel injection system 48, the fuel flowing in the fuel pipe 220 and the air flowing in the passage 156 may enter the secondary combustion zone 54 of the turbine combustor 14 separately (e.g., no premixing of air/fuel in the fuel nozzle 22). Moreover, in certain embodiments, the fuel pipe exit 228 may not be flush with the exit 162 of the secondary fuel nozzle 22. For example, the fuel pipe exit 228 may extend or protrude beyond the exit 162 of the secondary fuel nozzle 22, or the fuel pipe exit 228 may be recessed within the passage 156 of the secondary fuel nozzle 22. If the exit 162 is recessed inside the passage 156, then the fuel nozzle 22 premixes the fuel and air before injecting the fuel and air into the secondary combustion zone 54.

Figure 9:
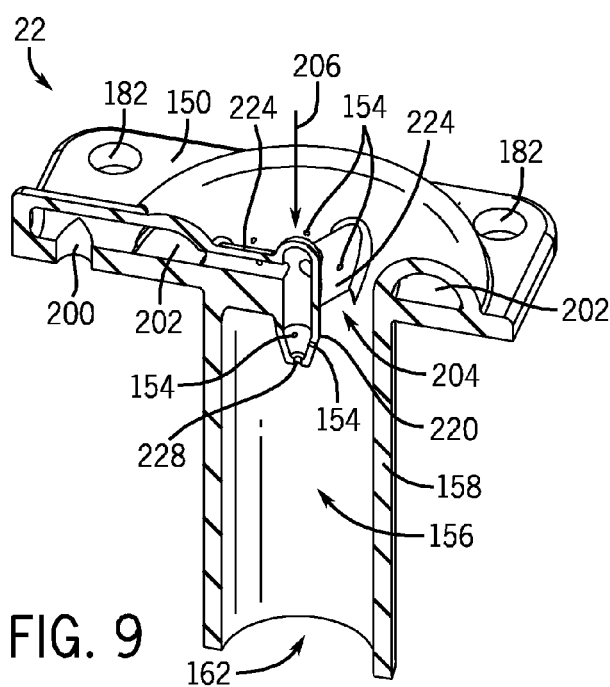
FIG. 9 is a partial cutaway perspective view of an embodiment of a fuel nozzle that may be used with the separate module secondary fuel injection system of FIGS. 2-6.

FIG. 9 is a cross-sectional perspective view of an embodiment of a secondary fuel nozzle 22 that may be used with and housed by the separate module secondary fuel injection system 48 of FIG. 3. The illustrated embodiment includes similar elements and element numbers as the embodiment shown in FIG. 7. The illustrated embodiment further includes the fuel pipe 220, where the fuel pipe exit 228 is recessed within the passage 156 of the secondary fuel nozzle 22. In other words, the exit 228 is offset from the exit 162 in a direction upstream from the exit 162, thereby enabling air/fuel premixing in the fuel nozzle 22. Additionally, the fuel pipe exit 228 has a tapered configuration. As mentioned above, fuel is received from the secondary fuel supply 90 through the fuel inlet 200 of the secondary fuel nozzle 22. The fuel is routed from the fuel inlet 200 to the annular fuel passage 202, and subsequently to the fuel paths 224 (e.g., tubes). In the illustrated embodiment, the annular fuel passage 202 and the fuel paths 224 includes fuel ports 154 through which fuel may flow and enter the passage 156 of the secondary fuel nozzle. Similarly, the fuel pipe 220 also includes fuel ports 154. As a result, fuel may enter the passage 156 of the secondary fuel nozzle 22 through the fuel ports 154 formed in the annular fuel passage 202, the fuel paths 224, and the fuel pipe 220. Additionally, fuel enters the passage 156 through the fuel pipe exit 228 of the fuel pipe 220. As discussed above, fuel that enters the passage 156 is mixed with air that enters the passage 156 through the opening 204 in the secondary fuel nozzle 22 to form the air-fuel mixture. The air-fuel mixture then exits the secondary fuel nozzle 22 through the exit 162 and flows into the secondary combustion zone 54 to be to be ignited in the turbine combustor 14.

Figure 10:
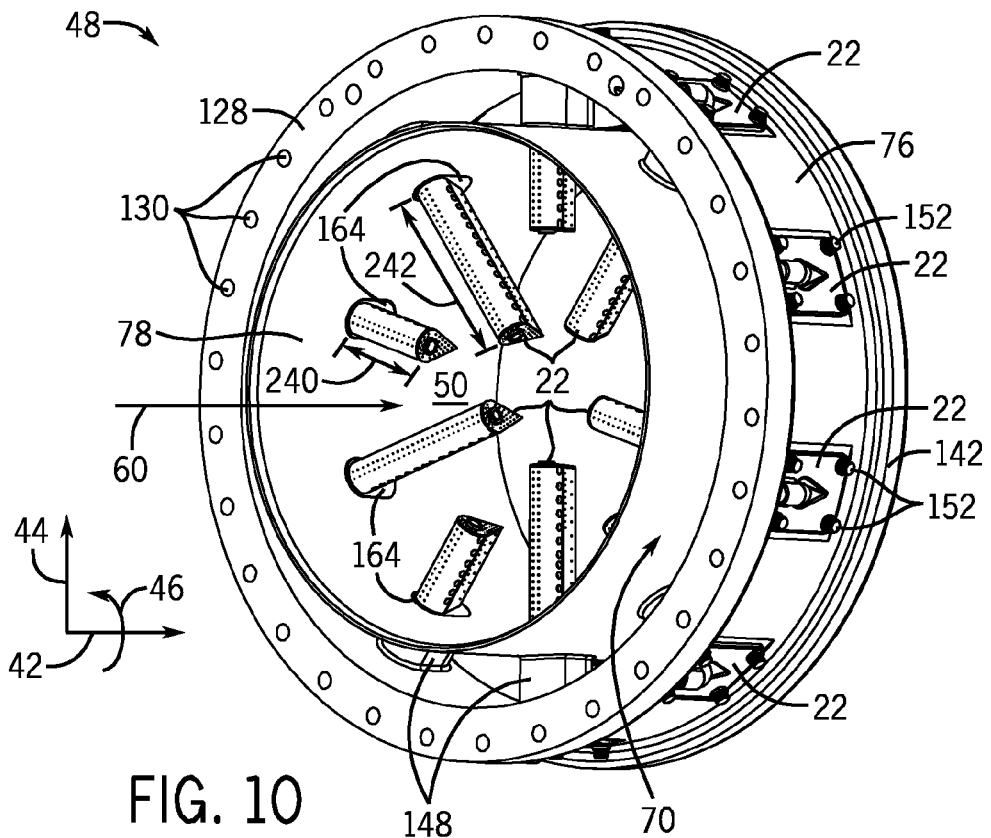
FIG. 10 is a perspective view of an embodiment of a separate module secondary fuel injection system that may be removably coupled to a turbine combustor.

FIG. 10 is a perspective view of an embodiment of the separate module secondary fuel injection system 48 of FIG. 5, illustrating secondary fuel nozzles 22 that extend at least partially from the inner wall 78 and into the combustion chamber 50. The illustrated embodiment includes similar elements and element numbers as the embodiment shown in FIG. 5. As mentioned above, the separate module secondary fuel injection system 48 is a self-contained unit which may be beneficial when replacing the separate module secondary fuel injection system 48 or its components (e.g., the secondary fuel nozzles 22). The illustrated embodiment shows the inner wall 78 which receives the liner 62 of the turbine combustor. Moreover, the illustrated embodiment of the separate module secondary fuel injection system 48 includes ten secondary fuel nozzles 22, which extend at least partially into the combustion chamber 50. Other embodiments of the separate module secondary fuel injection system 48 may include other numbers of secondary fuel nozzles 22. For example, the separate module secondary fuel injection system 48 may include approximately 1 to 50, 1 to 20, 1 to 15, 1 to 10 or 1 to 5 secondary fuel nozzles 22. As shown, the secondary fuel nozzles 22 extend into the combustion chamber 50 at varying distances. For example, some secondary fuel nozzles 22 extend a distance 240 into the combustion chamber 50, and other secondary fuel nozzles 22 extend a distance 242 into the combustion chamber 50. Additionally, the secondary fuel nozzles 22 are arranged such that the distance 240 or 242 which the secondary fuel nozzles 22 extend into the combustion chamber 50 is staggered about a circumference ### of the separate module secondary fuel injection system 48. In other embodiments, the secondary fuel nozzles 22 may extend the same distance 240 or 242 into the combustion chamber 50. Embodiments of the separate module secondary fuel injection system 48 having secondary fuel nozzles 22 extending into the secondary combustion zone 54 may be used in a variety of applications, such as after burner engines. Furthermore, as mentioned above, the flange 128 includes multiple recesses 130, e.g., threaded holes, which align with respective apertures 134 in the flange 132 of the flow sleeve 74 or the secondary fuel supply case 75. Each aperture in the flange 132 and its respective recess 130 in the flange 128 receive a fastener 136 to secure the flow sleeve 74 or the secondary fuel supply case 75 to the separate module secondary fuel injection system 48.

Figure 11:
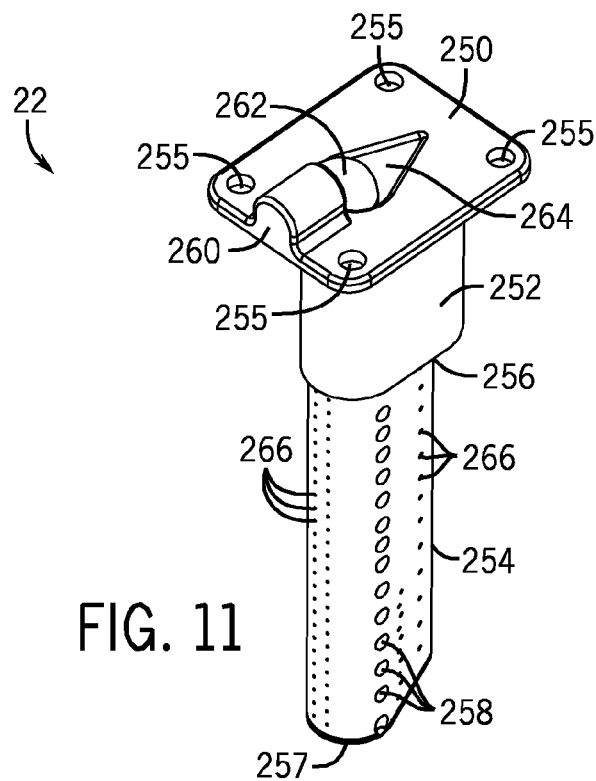
FIG. 11 is a perspective view of an embodiment of one of the fuel nozzles of the separate module secondary fuel injection system of FIG. 10.

FIG. 11 is a perspective view of an embodiment of the secondary fuel nozzle 22 that may be coupled to the separate module secondary fuel injection system 48 of FIG. 10. The illustrated embodiment includes a mounting portion 250, an upper portion 252, and a lower portion 254. The mounting portion 250 includes apertures 255 which receive fasteners that secure the secondary fuel nozzle 22 to the outer wall 76 of the separate module secondary fuel injection system 48. The upper portion 252 of the secondary fuel nozzle 22 is configured to be disposed in the intermediate portion 70 of the annulus 66 between the outer wall 76 and the inner wall 78 of the separate module secondary fuel injection system 48. In particular, the upper portion 252 has an edge 256 which may be flush with the aperture 164 of the inner wall 78 shown in FIG. 10. Furthermore, the upper portion 252 is a generally hollow structure, which includes air and fuel passages to inject air and fuel into the combustion chamber 50 of the combustor 14.

The lower portion 254 is configured to protrude from the inner wall 78 of the separate module secondary fuel injection system 48 and into the combustion chamber 50. In other words, the secondary fuel nozzle 22 has a peripheral end 257, which is configured to be offset from the inner wall 78 into the combustion chamber 50. The lower portion 254 is generally hollow and has an airfoil shape. The airfoil shape of the lower portion 254 enables the combustion products 60 flowing through the combustion chamber 50 to flow more efficiently. Moreover, the lower portion 254 includes fuel ports 258 through which an air/fuel mixture is injected into the combustion chamber 50. Specifically, the illustrated embodiment has a fuel inlet 260, which receives fuel from the secondary fuel supply 90. The fuel inlet 260 flows the fuel into a fuel passage 262. The fuel passage 262 flows the fuel into the hollow interiors of the upper and lower portions 252 and 254 of the secondary fuel nozzle 22. Furthermore, the air passage 264 of the secondary fuel nozzle 22 flows air from outside the turbine combustor 14 into the upper and lower portions 252 and 254 of the secondary fuel nozzle 22. Within the upper and lower portions 252 and 254, the air and fuel are mixed to create an air/fuel mixture. The air/fuel mixture is then injected into the combustion chamber 50 from the fuel passage 262 through the ports 258. The secondary fuel nozzle 22 also includes air ports 266 formed in the lower portion 254 of the secondary fuel nozzle 22. As will be appreciated, the air ports 266 may enable air from within the upper and lower portions 252 and 254 to pass into the combustion chamber 50 for use in combusting fuel within the combustion chamber 50. Additionally, air flowing through air ports 266 may operate to cool the secondary fuel nozzle 22.

Figure 12:
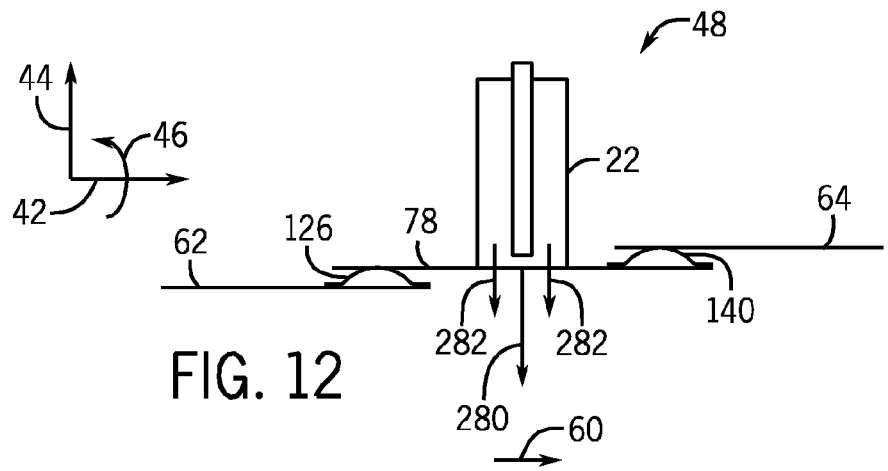
FIG. 12 is a schematic of a separate module secondary fuel injection system removably coupled to a turbine combustor, illustrating a fuel nozzle with a perpendicular orientation to a stream of combustion products within the turbine combustor.
Figure 13:
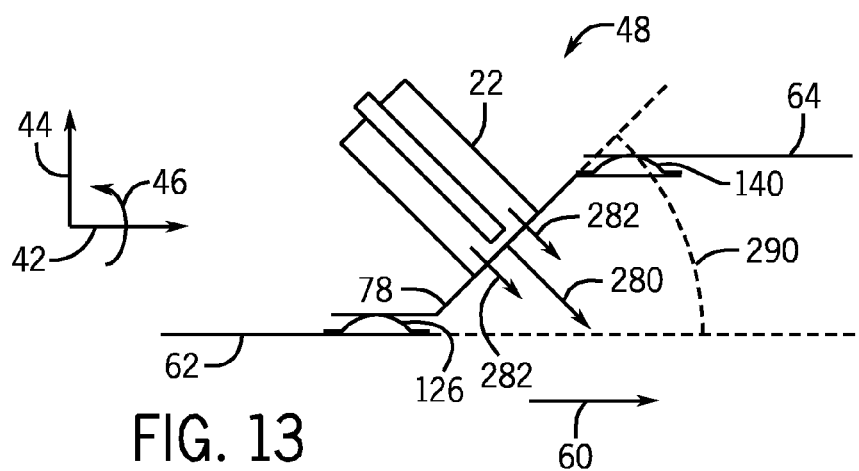
FIG. 13 is a schematic of a separate module secondary fuel injection system removably coupled to a turbine combustor, illustrating a fuel nozzle with a downstream angle orientation with respect to a stream of combustion products within the turbine combustor.
Figure 14:
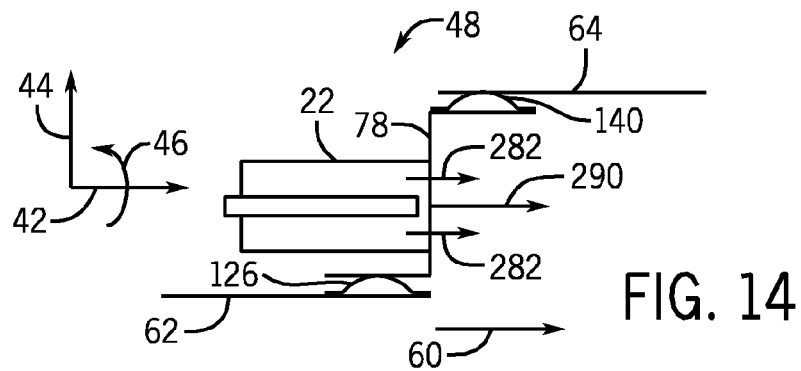
FIG. 14 is a schematic of a separate module secondary fuel injection system removably coupled to a turbine combustor, illustrating a fuel nozzle oriented with a downstream and substantially parallel orientation with respect to the stream of combustion products within the turbine combustor.

FIGS. 12-14 are schematics illustrating various configurations of secondary fuel nozzles 22 in the separate module secondary fuel injection system 48. Specifically, FIGS. 12-14 show secondary fuel nozzles 22 having different orientations with respect to the cross flow of the combustion products 60 in the secondary combustion zone 54. The embodiments illustrated in FIGS. 12-14 include similar elements and element numbers as the embodiment of the separate module secondary fuel injection system 48 shown in FIG. 3.

FIG. 12 shows the separate module secondary fuel injection system 48 with the secondary fuel nozzle 22 injecting fuel 280 and air 282 at an approximately 90 degree angle (i.e., perpendicular) to the flow of combustion products 60. In other words, the secondary fuel nozzle 22 injects fuel 280 and air 282 at an approximately 90 degree angle to the axis 42 of the turbine combustor 14. The embodiment shown in FIG. 13 illustrates the secondary fuel nozzle 22 disposed at a downstream angle 290 to the cross flow of the combustion products 60 in the secondary combustion zone 54. In the illustrated embodiment, the angle 290 is approximately 45 degrees. In other words, the secondary fuel nozzle 22 injects fuel 280 and air 282 at an approximately 45 degree angle to the axis 42 of the turbine combustor 14. In other embodiments, the angle 290 may be approximately 5 to 85 degrees, 10 to 80 degrees, 15 to 75 degrees, 20 to 70 degrees, 25 to 65 degrees, 30 to 60 degrees, 35 to 55 degrees, or 40 to 50 degrees. FIG. 14 illustrates the secondary fuel nozzle 22 disposed at an approximately zero degree angle (i.e., parallel) to the flow of combustion products 60 within the secondary combustion zone 54. In other words, the secondary fuel nozzle 22 injects fuel 280 and air 282 approximately parallel to the axis 42 of the turbine combustor 14. Furthermore, the embodiments shown in FIGS. 12-14 may be used in various combinations for fuel nozzles 22 in the separate module secondary combustion system 48.

As discussed in detail above, the disclosed embodiments provide a separate module secondary fuel injection system 48 that may be removably coupled to a turbine combustor 14, rather than mounting individual secondary fuel nozzles 22 directly to a liner 62, flow sleeve 74, and/or transition piece 64 of the turbine combustor 14. The separate module secondary fuel injection system 48 enables installation and removal of secondary fuel nozzles 22 independent of the liner 62 and the transition piece 64 of the turbine combustor 14. Additionally, the separate module secondary fuel injection system 48 may be installed and removed without completely removing the liner 62, the secondary fuel supply case 75, and/or the transition piece 64, which may generally remain mounted in the turbine combustor 14. Indeed, the separate module secondary fuel injection system 48 enables simultaneous installation and removal of multiple secondary fuel nozzles 22 at the same time, rather than requiring separate installation and removal of each secondary fuel nozzle 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A system, comprising:
  a turbine combustor, comprising:
    a primary fuel injection system;
    a first wall portion disposed about a primary combustion zone downstream from the primary fuel injection system;
    a second wall portion disposed downstream from the first wall portion; and a modular secondary fuel injection system disposed between the first wall portion and the second wall portion, wherein the modular secondary fuel injection system is removably coupled to the first and second wall portions, and the modular secondary fuel injection system comprises a fuel injector and an axial mounting recess, wherein the axial mounting recess is axial relative to a central axis of the turbine combustor; and a fastener having a central axis extending substantially parallel to the central axis of the turbine combustor and into the axial mounting recess to couple the modular secondary fuel injection system to the first wall portion or the second wall portion.

2. The system of claim 1, wherein the first wall portion comprises a liner and the second wall portion comprises a transition piece.

3. The system of claim 2, wherein the first wall portion further comprises a sleeve or case disposed about the liner, and the second wall portion further comprises an impingement sleeve disposed about the transition piece.

4. The system of claim 1, further comprising a first seal disposed between the first wall portion and the modular secondary fuel injection system, wherein the first seal is configured to enable movement of the first wall portion relative to the modular secondary fuel injection system.

5. The system of claim 1, further comprising a second seal disposed between the second wall portion and the modular secondary fuel injection system, wherein the second seal is configured to enable movement of the second wall portion relative to the modular secondary fuel injection system.

6. The system of claim 1, wherein the modular secondary fuel injection system comprises a plurality of fuel injectors coupled to a support structure, wherein the support structure comprises an inner wall, an outer wall disposed about the inner wall, and an air passage between the inner and outer walls, and the outer wall comprises the axial mounting recess.

7. The system of claim 6, wherein each fuel injector extends through the outer wall, the air passage, and the inner wall, wherein each fuel injector has a peripheral end substantially flush with the inner wall.

8. The system of claim 6, wherein each fuel injector extends through the outer wall, the air passage, and the inner wall, wherein each fuel injector has a peripheral end at an offset distance from the inner wall.

9. The system of claim 1, wherein the modular secondary fuel injection system comprises first and second fuel injectors coupled to a support structure, a first fuel supply line coupled to the first fuel injector, and a second fuel supply line coupled to the second fuel injector, wherein the first and second fuel supply lines are configured to supply fuel independently to the first and second fuel injectors.

10. A system, comprising:
a secondary fuel injection system, comprising:
a support structure comprising an axial mounting recess, wherein the axial mounting recess is axial relative to a central axis of the secondary fuel injection system; and
a plurality of fuel injectors coupled to the support structure, wherein the support structure is configured to removably mount axially between a first wall portion and a second wall portion of a turbine combustor downstream from a primary fuel injection system via a removable fastener having a central axis extending substantially parallel to a central axis of the turbine combustor into the axial mounting recess.

11. The system of claim 10, wherein the axial mounting recess is configured to axially abut the first wall portion, and the first wall portion is disposed upstream from the second wall portion.

12. The system of claim 11, further comprising a first seal configured to mount between the first wall portion and the support structure, and a second seal configured to mount between the second wall portion and the support structure, wherein the first and second seals are configured to enable movement of the first and second wall portions relative to one another.

13. The system of claim 10, wherein the support structure comprises an inner wall, an outer wall disposed about the inner wall, and an air passage between the inner and outer walls, and the outer wall comprises the axial mounting recess.

14. The system of claim 13, wherein each fuel injector extends through the outer wall, the air passage, and the inner wall, wherein each fuel injector has a peripheral end substantially flush with the inner wall.

15. The system of claim 13, wherein each fuel injector extends through the outer wall, the air passage, and the inner wall, wherein each fuel injector has a peripheral end at an offset distance from the inner wall.

16. The system of claim 10, wherein the secondary fuel injection system further comprises a first fuel supply line coupled to a first fuel injector of the plurality of fuel injectors, and a second fuel supply line coupled to the first fuel injector of the plurality of fuel injectors, wherein the first and second fuel supply lines are configured to supply fuel independently to the first fuel injector.

17. The system of claim 10, wherein each fuel injector comprises a mounting flange, an air tube protruding from the mounting flange, and at least one fuel injection port leading into the air tube.

18. A system, comprising:
a turbine fuel injection module, comprising:
an annular support structure comprising an inner annular wall, an outer annular wall disposed about the inner annular wall, and an air passage extending between the inner and outer annular walls, wherein the air passage is configured to fluidly couple with an annulus defined by a liner and a flow sleeve of a turbine combustor;
a plurality of fuel injectors coupled to the annular support structure, wherein each fuel injector extends through the outer annular wall, the air passage, and the inner annular wall; and
wherein the outer annular wall comprises at least one axial mounting recess configured to receive a fastener to removably mount the outer annular wall of the annular support structure to the turbine combustor, wherein the axial mounting recess is axial relative to a central axis of the turbine combustor and wherein the fastener has a central axis that extends substantially parallel to the central axis of the turbine combustor.

19. The system of claim 18, wherein the turbine fuel injection module comprises at least one movable seal configured to seal the annular support structure to the turbine combustor while enabling movement of the turbine combustor relative to the annular support structure.

20. The system of claim 19, wherein the at least one movable seal comprises at least one hula seal disposed along the inner annular wall and at least one piston ring seal disposed along the outer annular wall.

21. The system of claim 8, wherein the offset distance is equal for each fuel injector.

22. The system of claim 8, wherein the offset distance is not equal for each fuel injector.

23. The system of claim 8, wherein the offset distance for each fuel injector alternates between a first offset distance and a second offset distance about a circumference of the turbine combustor.

24. The system of claim 8, wherein each fuel injector comprises an airfoil geometry.

25. The system of claim 6, wherein the plurality of fuel injectors are oriented at an angle relative to a longitudinal axis of the turbine combustor, wherein the angle is perpendicular, parallel, or acute.

* * * * *